United States Patent
Fujiki et al.

(10) Patent No.: US 11,848,770 B2
(45) Date of Patent: Dec. 19, 2023

(54) RECEIVING APPARATUS, TRANSMITTING APPARATUS, RECEIVING METHOD, AND TRANSMITTING METHOD

(71) Applicant: Sony Semiconductor Solutions Corporation, Kanagawa (JP)

(72) Inventors: Toshihiro Fujiki, Kanagawa (JP); Seiji Kobayashi, Kanagawa (JP); Katsuki Hirabayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 391 days.

(21) Appl. No.: 17/264,306

(22) PCT Filed: Jul. 26, 2019

(86) PCT No.: PCT/JP2019/029390
§ 371 (c)(1),
(2) Date: Jan. 29, 2021

(87) PCT Pub. No.: WO2020/031748
PCT Pub. Date: Feb. 13, 2020

(65) Prior Publication Data
US 2021/0297177 A1    Sep. 23, 2021

(30) Foreign Application Priority Data
Aug. 7, 2018    (JP) .................. 2018-148460

(51) Int. Cl.
*H04L 1/00*    (2006.01)
*H04L 5/00*    (2006.01)
(Continued)

(52) U.S. Cl.
CPC .......... *H04L 1/0005* (2013.01); *H04L 1/0016* (2013.01); *H04L 5/0053* (2013.01);
(Continued)

(58) Field of Classification Search
CPC ... H04L 1/0005; H04L 1/0016; H04L 5/0053; H04L 69/22; H04W 72/541; H04W 8/26; H04W 28/20
(Continued)

(56) References Cited

U.S. PATENT DOCUMENTS

| | | | |
|---|---|---|---|
| 2002/0018527 A1* | 2/2002 | Vanderaar ............. | H04L 5/0053 375/259 |
| 2015/0063258 A1* | 3/2015 | Merlin .................. | H04L 1/1861 370/329 |
| 2017/0070259 A1 | 3/2017 | Sato et al. | |

FOREIGN PATENT DOCUMENTS

| | | |
|---|---|---|
| CN | 102037656 A | 4/2011 |
| CN | 104247369 A | 12/2014 |

(Continued)

OTHER PUBLICATIONS

International Search Report and Written Opinion dated Aug. 27, 2019, received for PCT Application PCT/JP2019/029390, Filed on Jul. 26, 2019, 6 pages including English Translation.

*Primary Examiner* — Chi Tang P Cheng
(74) *Attorney, Agent, or Firm* — XSENSUS LLP

(57) ABSTRACT

To extend the number of bits of an identifier without affecting the number of data bits to be transmitted. The present disclosure provides a receiving apparatus (1102) that identifies a transmitting apparatus (1101) based on a first identifier (10) having been individually given to each transmitting apparatus in order to identify the transmitting apparatus and a second identifier (20) which is for identifying the transmitting apparatus and which is shared among a plurality of transmitting apparatuses. According to this configuration, the number of bits of an identifier can be extended without affecting the number of data bits.

17 Claims, 13 Drawing Sheets

(51) Int. Cl.
    *H04L 69/22*     (2022.01)
    *H04W 8/26*      (2009.01)
    *H04W 72/541*    (2023.01)
    *H04W 28/20*     (2009.01)

(52) U.S. Cl.
    CPC .............. *H04L 69/22* (2013.01); *H04W 8/26* (2013.01); *H04W 72/541* (2023.01); *H04W 28/20* (2013.01)

(58) Field of Classification Search
    USPC ........................................................ 370/329
    See application file for complete search history.

(56) References Cited

FOREIGN PATENT DOCUMENTS

| | | |
|---|---|---|
| EP | 3113396 A1 | 1/2017 |
| EP | 3306886 A1 | 4/2018 |
| EP | 3806508 A1 | 4/2021 |
| JP | 56-51144 A | 5/1981 |
| JP | 2010-74460 A | 4/2010 |
| WO | 2015/129375 A1 | 9/2015 |
| WO | WO-2018003275 A1 | 1/2018 |

\* cited by examiner

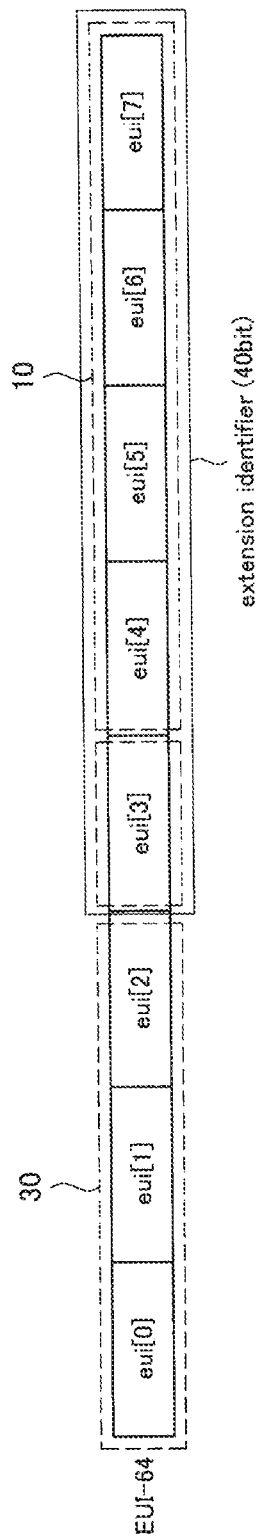

SYNCHRONIZATION PATTERN GENERATION

SCRAMBLED PATTERN GENERATION

MULTIPLEXED PATTERN

Fig. 6

| ORGANIZATION NAME | OUI | eui[3] | SYNCHRONIZATION PATTERN GENERATION PARAMETER | SCRAMBLED PATTERN GENERATION PARAMETER | MULTIPLEXING PARAMETER |
|---|---|---|---|---|---|
| COMPANY A | 24'h08_0046 (08:00:46) | 8'b0000_0000 (00) | 25-bit LFSR INITIAL VALUE 1<br>25-bit LFSR INITIAL VALUE 2 | 24-bit LFSR INITIAL VALUE 9 | 32-bit LFSR INITIAL VALUE 13<br>32-bit LFSR INITIAL VALUE 14 |
| | | 8'b0000_0001 (01) | 25-bit LFSR INITIAL VALUE 3<br>25-bit LFSR INITIAL VALUE 4 | 24-bit LFSR INITIAL VALUE 10 | 32-bit LFSR INITIAL VALUE 15<br>32-bit LFSR INITIAL VALUE 16 |
| COMPANY B | 24'h00_0ad9 (00:0a:d9) | 8'b0000_0000 (00) | 25-bit LFSR INITIAL VALUE 5<br>25-bit LFSR INITIAL VALUE 6 | 24-bit LFSR INITIAL VALUE 11 | 32-bit LFSR INITIAL VALUE 17<br>32-bit LFSR INITIAL VALUE 18 |
| COMPANY C | 24'h01_000c (01:00:0c) | 8'b0000_0000 (00) | 25-bit LFSR INITIAL VALUE 7<br>25-bit LFSR INITIAL VALUE 8 | 24-bit LFSR INITIAL VALUE 12 | 32-bit LFSR INITIAL VALUE 19<br>32-bit LFSR INITIAL VALUE 20 |

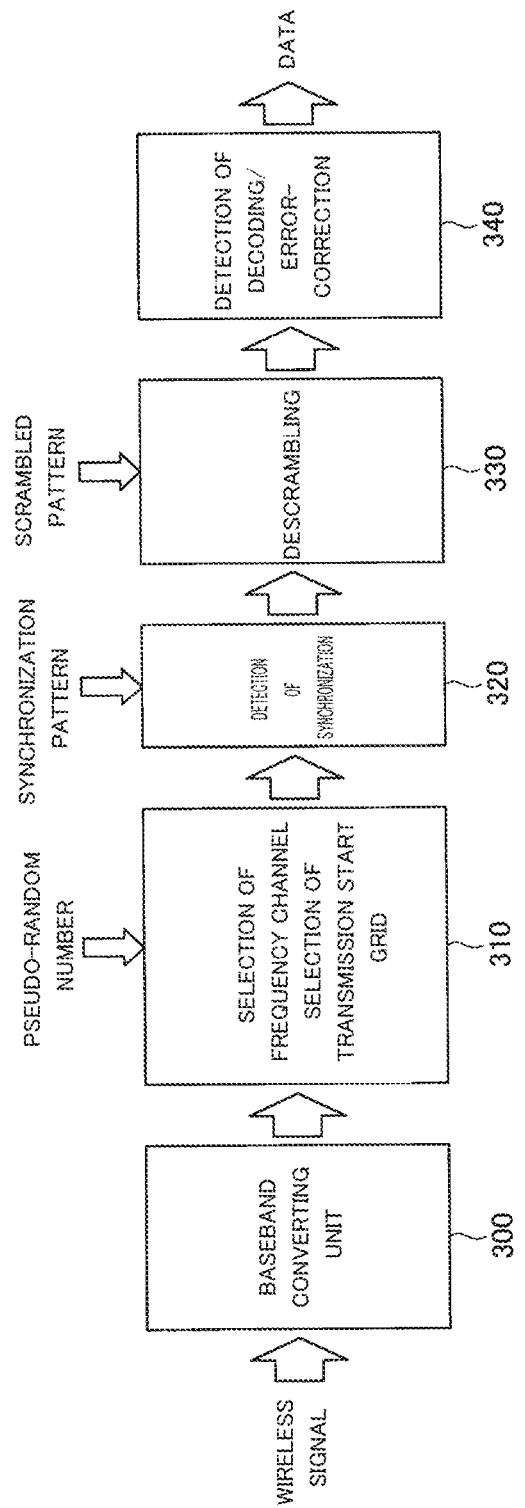

Fig. 9

| ORGANIZATION NAME | OUI | eui[3] | SYNCHRONIZATION PATTERN GENERATION PARAMETER | SCRAMBLE GENERATION PARAMETER | MULTIPLEXING PARAMETER AND FREQUENCY CHANNEL |
|---|---|---|---|---|---|
| COMPANY A | 24'h08_0046 (08:00:46) | 8'b0000_0000 (00) | 25-bit LFSR POLYNOMIAL 1<br>25-bit LFSR POLYNOMIAL 2 | 24-bit LFSR POLYNOMIAL 9 | 32-bit LFSR POLYNOMIAL 13<br>32-bit LFSR POLYNOMIAL 14 |
| COMPANY A | 24'h08_0046 (08:00:46) | 8'b0000_0001 (01) | 25-bit LFSR POLYNOMIAL 3<br>25-bit LFSR POLYNOMIAL 4 | 24-bit LFSR POLYNOMIAL 10 | 32-bit LFSR POLYNOMIAL 15<br>32-bit LFSR POLYNOMIAL 16 |
| COMPANY B | 24'h00_0ad9 (00:0a:d9) | 8'b0000_0000 (00) | 25-bit LFSR POLYNOMIAL 5<br>25-bit LFSR POLYNOMIAL 6 | 24-bit LFSR POLYNOMIAL 11 | 32-bit LFSR POLYNOMIAL 17<br>32-bit LFSR POLYNOMIAL 18 |
| COMPANY C | 24'h01_000c (01:00:0c) | 8'b0000_0000 (00) | 25-bit LFSR POLYNOMIAL 7<br>25-bit LFSR POLYNOMIAL 8 | 24-bit LFSR POLYNOMIAL 12 | 32-bit LFSR POLYNOMIAL 19<br>32-bit LFSR POLYNOMIAL 20 |

RECEIVING APPARATUS, TRANSMITTING APPARATUS, RECEIVING METHOD, AND TRANSMITTING METHOD

CROSS-REFERENCE TO RELATED APPLICATIONS

The present application is based on PCT filing PCT/JP2019/029390, filed Jul. 26, 2019, which claims priority to JP 2018-148460, filed Aug. 7, 2018, the entire contents of each are incorporated herein by reference.

TECHNICAL FIELD

The present disclosure relates to a receiving apparatus, a transmitting apparatus, a receiving method, and a transmitting method.

BACKGROUND ART

Conventionally, PTL 1 cited below describes generating, for the purpose of enabling a receiving apparatus to acquire identification information of a transmitting apparatus based on an estimation result of a diffusion code used in a transmission signal, a transmission signal that diffuses transmission information using a diffusion code selected in accordance with identification information.

CITATION LIST

Patent Literature

[PTL 1]
WO 2015/129375

SUMMARY

Technical Problem

When a transmitter performs a transmission by including an identifier in a transmission frame so as to enable a receiver to distinguish data to be sent to the receiver, an increase in the number of bits of the identifier causes the number of bits of data to be actually transmitted to decrease.

In particular, when a data communication amount is set to a small amount in advance, it is expected that a reduction in the number of bits of data due to an increase in the number of bits of an identifier may lead to a situation where necessary data cannot be transmitted.

The technique described in PTL 1 relates to a technique for diffusing transmission information using a diffusion code selected in accordance with identification information. Therefore, PTL 1 does not anticipate including identification information in a transmission frame itself.

Accordingly, there is a demand for extending the number of bits of an identifier without affecting the number of data bits to be transmitted.

Solution to Problem

The present disclosure provides a receiving apparatus that identifies a transmitting apparatus based on a first identifier having been individually given to each transmitting apparatus in order to identify the transmitting apparatus and a second identifier which is for identifying the transmitting apparatus and which is being shared among a plurality of the transmitting apparatuses.

In addition, the present disclosure provides a transmitting apparatus which inserts a first identifier having been individually given to each transmitting apparatus into a transmission frame and which modulates a transmission signal of the transmission frame based on a second identifier being shared among a plurality of the transmitting apparatuses and transmits the modulated transmission signal to a receiving apparatus.

Furthermore, the present disclosure provides a receiving method of identifying a transmitting apparatus based on a first identifier having been individually given to each transmitting apparatus in order to identify the transmitting apparatus and a second identifier which is for identifying the transmitting apparatus and which is being shared among a plurality of the transmitting apparatuses.

In addition, the present disclosure provides a transmitting method including the steps of; inserting a first identifier having been individually given to each transmitting apparatus into a transmission frame; and modulating a transmission signal of the transmission frame based on a second identifier being shared among a plurality of the transmitting apparatuses and transmitting the modulated transmission signal to a receiving apparatus.

Advantageous Effect of Invention

According to the present disclosure, the number of bits of an identifier can be extended without affecting the number of data bits to be transmitted. It should be noted that the advantageous effect described above is not necessarily restrictive and, in addition to the advantageous effect described above or in place of the advantageous effect described above, any of the advantageous effects described in the present specification or other advantageous effects that can be comprehended from the present specification may be produced.

BRIEF DESCRIPTION OF DRAWINGS

FIG. 3 is a schematic diagram showing an example of adding virtual high-order bits to an identifier on a transmission frame.

FIG. 6 is a schematic diagram which shows a configuration of a modulation parameter table shown in FIG. 1 and which represents an example in which virtual high-order bits and a modulation parameter are associated with each other.

FIG. 8 is a block diagram showing a configuration of a receiver.

FIG. 9 is a schematic diagram which shows a configuration of the modulation parameter table shown in FIG. 1 and which represents an example in which virtual high-order bits and a modulation parameter are associated with each other.

DESCRIPTION OF EMBODIMENT

Figure 1:
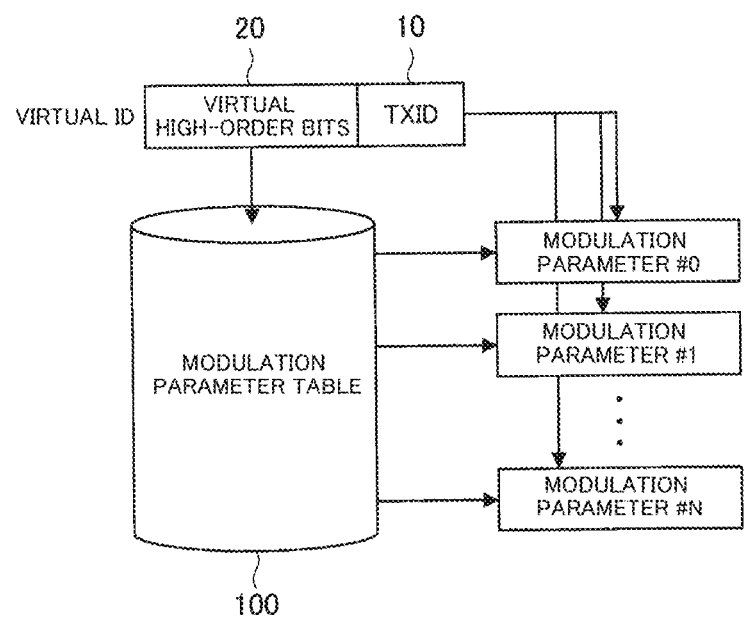
FIG. 1 is a schematic diagram showing a situation in which virtual high-order bits are constructed on a high-order bit of an identifier (TXID) on a transmission frame.

Hereinafter, a preferred embodiment of the present disclosure will be described in detail with reference to the accompanying drawings. In the present specification and the drawings, components having substantially the same functional configuration will be denoted by the same reference signs and overlapping descriptions thereof will be omitted.

Descriptions will be given in the following order.
1. Background
2. Outline of present disclosure
3. Specific example of modulation parameter
4. Configuration example of LFSR
5. Example of combination of virtual high-order bits and modulation parameter
6. Configuration example of system according to present embodiment
7. Function block configuration of receiver
8. Modifications according to present embodiment
8.1 Example of extending identifier by changing polynomial of LFSR
8.2 Example of extending identifier by changing initial value and polynomial of LFSR
8.3 Example of partially using shared modulation parameters among plurality of modulation parameters
8.4 Other modifications
1. Background The present disclosure relates to LPWA (Low Power Wide Area) communication that is used in IoT (Internet of Things) or the like. Features of LPWA communication include transmitting and receiving data with a small payload (around 100 bits) using a low bit rate and low power consumption. A transmitter performs transmission by including an identifier (ID (TXID)) in a transmission frame so as to enable a receiver to distinguish data to be sent to the receiver. Examples of LPWA communication include Sigfox and LoRa.

Japan Ministry of Internal Affairs and Communications Notification "*Tanmatsu Setsubitou Kisoku no Kitei ni Motozuku Shikibetsu Fugou no Jokentou* (Identification Codes and other Conditions based on rules of Ordinance Concerning Terminal Facilities, etc.)" specifies that a length of an identifier of a terminal of a transmitter be 32 bits or longer in specified low-power radio equipment (920 MHz band). Since the number of data bits that can be included a transmission frame is only around 100 bits, for example, an identifier is constituted by 32 bits in Sigfox and LoRa. Accordingly, a reduction in the number of data bits can be minimized and necessary data can be transmitted.

However, when identifiers (32 bits) on a transmission frame are allocated to all transmitters and the identifiers are exhausted, a new transmitter can no longer be added. In other words, when identifiers are expected to be allocated to a large number of transmitters, there is a problem in that the number of bits of identifiers may become depleted.

In addition, global standards in communication such as IEEE and ETSI (European Telecommunications Standards Institute) specify that a terminal of a transmitter needs to be identified by more than 32 bits.

Therefore, in LPWA communication, there are demands for a mechanism that increases the number of bits of an identifier for identifying a transmitter while suppressing a decrease in the number of data bits.

2. Outline of Present Disclosure

In the embodiment of the present disclosure, in LPWA communication for transmitting a small amount of data, an identifier (TXID: 32 bits) in a transmission frame and a modulation parameter for wireless communication are combined to virtually construct high-order bits of the identifier. In the case of wireless communication, modulation is performed in order to transmit data through space. By associating the modulation parameter for performing the modulation and virtual high-order bits of an identifier with each other, the number of bits of the identifier can be extended.

In this case, the modulation parameter is not a bit pattern itself to be transmitted that is defined in a MAC layer but, rather, a parameter for generating a difference in modulation of RF signals that is defined in a PHY layer. Types of modulation include a synchronization signal pattern, a scrambled pattern, a frequency hopping pattern, a transmission start timing, and a spread spectrum coefficient. In addition, modulation parameters include parameters such as an initial value, a polynomial, a bit operation (selection, allocation, inversion, or exchange), and an algorithm type which realize each modulation.

FIG. 1 is a schematic diagram showing a situation in which virtual high-order bits 20 are constructed on a high-order bit of an identifier (TXID) 10 on a transmission frame. Modulation parameters #0 to #N are obtained by referring to a modulation parameter table from the virtual high-order bits 20. Accordingly, even if the identifier 10 is the same, changing the modulation parameter enables identifiers with an extended number of bits to be realized based on the virtual high-order bits 20. As will be described later, as the virtual high-order bits 20, a unique value allocated to each organization constituting a network of communication based on IoT or the like can be used.

FIG. 1 shows processing to be mainly performed by a transmitter. The transmitter inserts the identifier 10 having been individually given to each transmitter into a transmission frame, modulates a transmission signal of the transmission frame based on information on the virtual high-order bits 20 being shared among a plurality of the transmitters, and transmits the modulated transmission signal to a receiver.

The receiver determines a transmission frame 50 to be received based on the identifier 10. A transmission frame 10 to which the identifier 10 has not been given to be received by the receiver is not received by the receiver. In addition, as a premise, an identifier and a modulation method of a transmission wave are understood by the receiver in advance. The receiver also performs processing similar to that shown in FIG. 1. In order to specify and demodulate a transmission wave, an identifier and a modulation parameter are registered to the receiver in a similar manner to a database 100 shown in FIG. 1. In other words, when an identifier and a modulation parameter are unknown, demodulation cannot be performed by the receiver.

It should be noted that the system according to the present embodiment assumes one-way communication (uplink)

from a transmitter to a receiver and does not assume requesting specific data by sending an instruction (downlink) to the transmitter.

Figure 2:
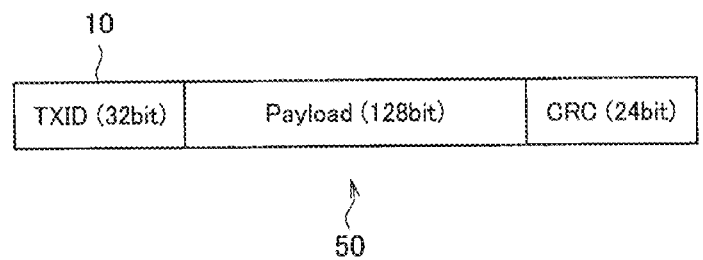
FIG. 2 is a schematic diagram showing an example of a configuration of a transmission frame (PSDU) according to a present embodiment.

FIG. 2 is a schematic diagram showing an example of a configuration of the transmission frame (PSDU) 50 according to the present embodiment. As shown in FIG. 2, in the transmission frame 50, the identifier 10 is set to 32 bits, a payload is set to 128 bits, and a CRC is set to 24 bits.

FIG. 3 is a schematic diagram which shows an example of an IEEE 64-bit Global Identifier (EUI-64) and which represents an example of adding virtual high-order bits to the identifier 10 on a transmission frame. In FIG. 3, each of euis [0] to [7] is 8 bits and the euis [4] to [7] correspond to the 32-bit identifier 10.

In addition, the euis [0] to [2] correspond to an OUI (or a CID (Company ID)) 30. The OUI (or the CID (Company ID)) 30 is a 24-bit value issued by the IEEE Registration Authority (IEEE RA) and is bits guaranteed to have a unique value with respect to an organization or a company.

The eui [3] and the euis [4] to [7] that correspond to the identifier 10 are 40 bits excluding the OUI 30 and are freely definable by each organization that constitutes the system. When extending the identifier, simply increasing the number of bits of the identifier 10 of the transmission frame 50 shown in FIG. 2 ends up reducing the number of bits of the payload. In the present embodiment, it is assumed that 32 low-order bits thereof are mounted to the transmission frame 50 as the identifier 10 on the transmission frame. In addition, the OUI 30 and eui [3] are combined to be used as the virtual high-order bits 20.

Furthermore, for example, when performing a logo authentication by an alliance or the like, a modulation parameter which differs from those of other organizations is defined and the modulation parameter is associated with values of the OUI 30 and the eui [3]. Accordingly, in addition to the 32 bits of the identifier 10, the 32 bits of the OUI 30 and the eui [3] can be made to function as a virtual identifier and an extended identifier of a total of 64 bits can be constructed.

3. Specific Example of Modulation Parameter

In the present embodiment, as the modulation parameter to be associated with the values of the OUI 30 and the eui [3], a synchronization pattern generation parameter (25 bits×2), a scrambled pattern generation parameter (24 bits× 1), and a multiplexing parameter (32 bits×2) are used. As the multiplexing parameter, a transmission start timing (a grid number) and a frequency hopping channel number are calculated.

Figure 4A:
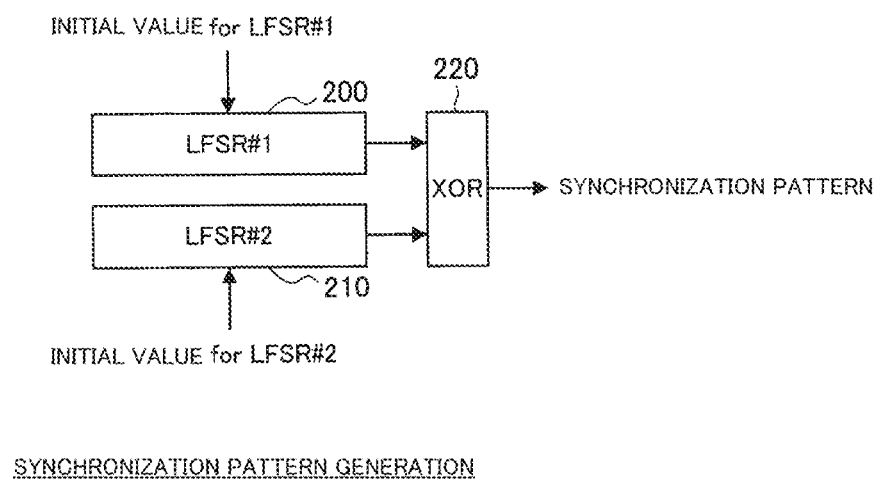
FIG. 4A is a schematic diagram showing a situation where a synchronization pattern is generated using a synchronization pattern generation parameter.
Figure 4B:
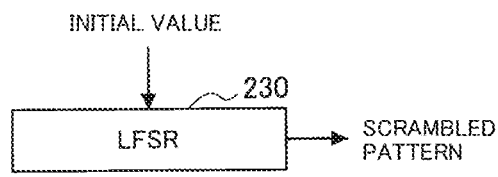
FIG. 4B is a schematic diagram showing a situation where a scrambled pattern is generated using a scrambled pattern generation parameter.
Figure 4C:
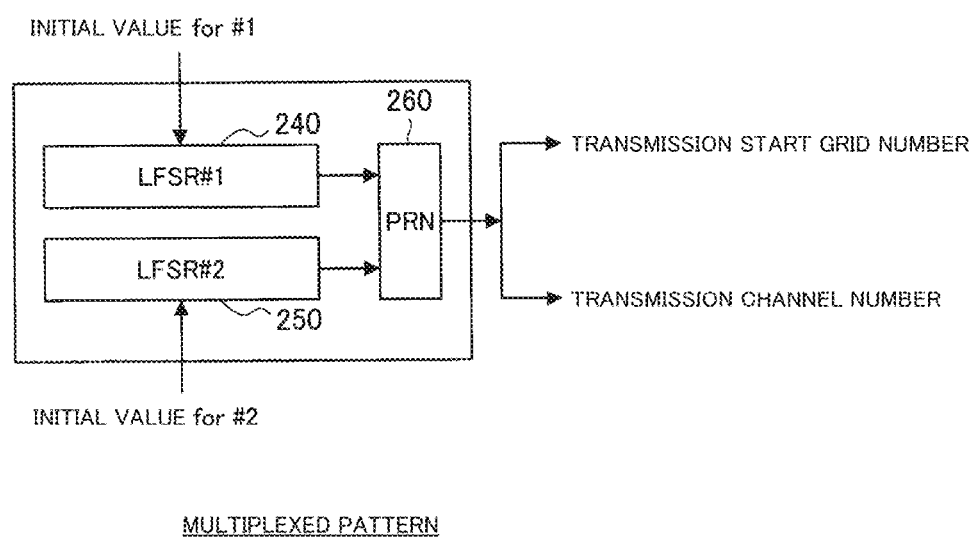
FIG. 4C is a schematic diagram showing a situation where a multiplexed pattern is generated using a multiplexing parameter.

FIGS. 4A to 4C are schematic diagrams showing a situation where a synchronization pattern, a scrambled pattern, and a multiplexed pattern are generated using a synchronization pattern generation parameter, a scrambled pattern generation parameter, and a multiplexing parameter. When generating a synchronization pattern, a scrambled pattern, and a multiplexed pattern, an LFSR (Linear Feedback Shift Register) is used in all cases. In an LFSR, a circuit is configured using feedback from a shift register and an exclusive OR (XOR) and, at the same time, a feedback position is determined by a primitive polynomial. A configuration of an LFSR will be described later.

FIG. 4A is a schematic diagram showing a situation where a synchronization pattern is generated using a synchronization pattern generation parameter. When generating the synchronization pattern using the synchronization pattern generation parameter, two LFSRs, namely an LFSR (#1) 200 and an LFSR (#2) 210 are used. Both the LFSR (#1) 200 and the LFSR (#2) 210 are constituted by a 25-bit LFSR polynomial.

In addition, when generating the synchronization pattern, a 25-bit initial value 1 and a 25-bit initial value 2 are used as modulation parameters (synchronization pattern generation parameters). The initial value 1 is input to the LFSR (#1) 200 and the initial value 2 is input to the LFSR (#2) 210.

As shown in FIG. 4A, the synchronization pattern is generated by having an exclusive OR unit 220 calculate an exclusive OR (XOR) of a value output from the LFSR (#1) 200 and a value output from the LFSR (#2) 210.

FIG. 4B is a schematic diagram showing a situation where a scrambled pattern is generated using a scrambled pattern generation parameter. When generating the scrambled pattern using the scrambled pattern generation parameter, one LFSR 230 is used. The LFSR 230 is constituted by a 24-bit LFSR polynomial.

In addition, when generating the scrambled pattern, a 24-bit initial value is used as a modulation parameter (a scrambled pattern generation parameter). The initial value is input to the LFSR 230. As shown in FIG. 4B, a value output from the LFSR 230 is adopted as the scrambled pattern.

FIG. 4C is a schematic diagram showing a situation where a multiplexed pattern (a transmission start grid number and a transmission channel number) is generated using a multiplexing parameter. When generating the multiplexed pattern, two LFSRs, namely an LFSR (#1) 240 and an LFSR (#2) 250 are used. Both the LFSR (#1) 240 and the LFSR (#2) 250 are constituted by a 32-bit LFSR polynomial.

In addition, when generating the multiplexed pattern, a 32-bit initial value 1 and a 32-bit initial value 2 are used as modulation parameters (multiplexed pattern generation parameters). The initial value 1 is input to the LFSR (#1) 240 and the initial value 2 is input to the LFSR (#2) 250.

As shown in FIG. 4C, a value output from the LFSR (#1) 240 and a value output from the LFSR (#2) 250 are input to a pseudo-random number generating unit 260. The pseudo-random number generating unit 260 generates the multiplexed pattern (a transmission start grid number and a transmission channel number) by generating a pseudo-random number (PRN). In other words, a multiplexed pattern is a pattern for determining a transmission timing and a transmission channel.

4. Configuration Example of LFSR

Figure 5:
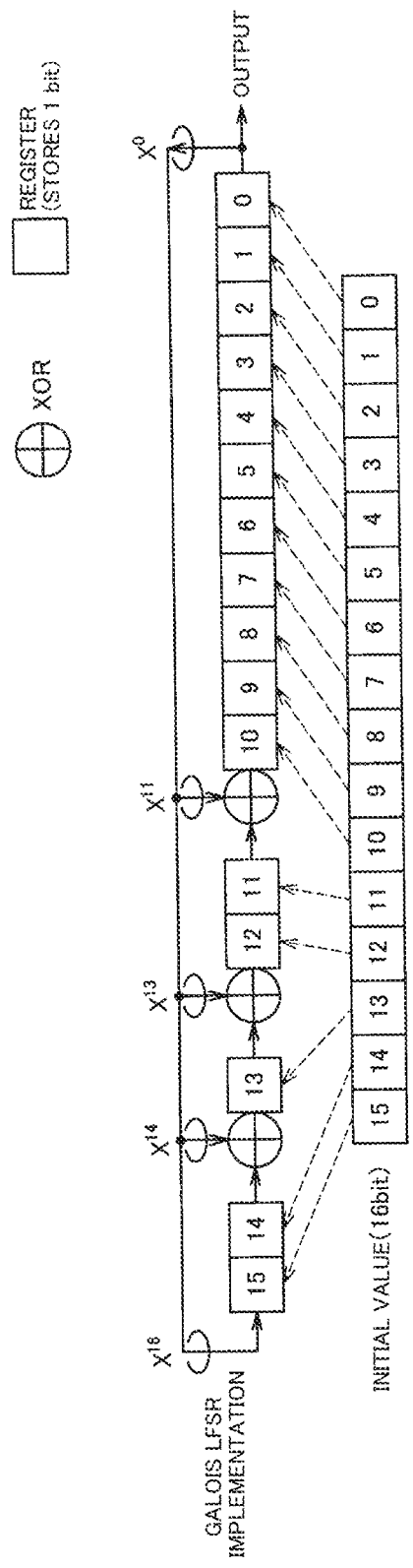
FIG. 5 is a schematic diagram showing a configuration of a general LFSR.

FIG. 5 is a schematic diagram showing a configuration of a general LFSR. In an LFSR, a circuit is configured using feedback from a shift register and an exclusive OR (XOR) and a feedback position is determined by a primitive polynomial. FIG. 5 shows a case where the primitive polynomial is expressed by the following equation.

$$p(x)=x^{16}+x^{14}+x^{13}+x^{11}+1$$

While methods of implementing an LFSR include a Galois-type implementation and a Fibonacci-type implementation, in the present embodiment, the Galois-type implementation is used as an example.

In an LFSR, an initial value (a seed) is set to each register prior to start of operation. In doing so, the initial values described with reference to FIGS. 4A to 4C are set. While FIG. 5 shows an example of a case of a 16-bit initial value, as described above, the initial value in synchronization pattern generation is 25 bits, the initial value in scrambled pattern generation is 24 bits, and the initial value in multiplexed pattern generation is 32 bits. A configuration of the LFSR is changed as appropriate in accordance with the number of bits.

5. Example of Combination of Virtual High-Order Bits and Modulation Parameter FIG. 6 is a schematic diagram which shows a configuration of a modulation parameter table 100 shown in FIG. 1 and which represents an example in which the virtual high-order bits 20 and a modulation parameter are associated with each other. A case will now be assumed where three organizations, namely, Company A, Company B, and Company C perform logo authentication through alliances between the organizations. A 24-bit OUI 30 is given to each of Company A, Company B, and Company C as unique values. In addition, as shown in FIG. 6, with respect to the eui [3], two values ("00" and "01") are given to Company A and one value ("00") is respectively given to Company B and Company C. By setting the value of the eui [3] in two ways, the number of bits of the virtual high-order bits 20 can be further extended.

In addition, with respect to a combination of the OUI 30 and the eui [3], the initial values (two) of the synchronization pattern generation parameter, the initial value (one) of the scramble generation parameter, and the initial values (two) of the multiplexing parameter are respectively given.

For example, with respect to a combination of the OUI 30 and the eui [3] (="00") of Company A, the initial value 1 of the LFSR (#1) 200 and the initial value 2 of the LFSR (#2) 210 for synchronization pattern generation are set. In a similar manner, with respect to a combination of the OUI 30 and the eui [3] (="01") of Company A, an initial value 9 of the LFSR 230 for scrambled pattern generation and an initial value 13 of the LFSR (#1) 240 and an initial value 14 of the LFSR (#2) 250 for multiplexed pattern generation are set.

Using the modulation parameter table 100 shown in FIG. 6, a transmitter acquires each of a synchronization pattern generation parameter, a scrambled pattern generation parameter, and a multiplexing parameter, and generates a synchronization pattern, a scrambled pattern, and a multiplexed pattern by the methods shown in FIGS. 4A to 4C.

Therefore, a modulation pattern is generated based on a modulation parameter determined by the 32 virtual bits of the OUI 30 and the eui [3], and a transmission signal of the transmission frame 50 is modulated by the modulation pattern and then transmitted. In a similar manner, a receiver also generates a modulation pattern based on a modulation parameter that is determined by the OUI 30 and the eui [3]. Therefore, by having a transmitter and a receiver generate the same modulation pattern, when a transmission frame is modulated and transmitted from the transmitter from the receiver, the receiver recognizes the transmission frame as being sent from a transmitter belonging to the same organization and the receiver can demodulate and receive the transmission frame.

As result, in addition to the 32 original bits of the identifier 10, the virtual 32 bits of the OUI 30 and the eui [3] can be made to function as an identifier and an identifier of a total of 64 bits can be constructed. Therefore, even if the identifier 10 has the same value, changing the modulation parameter enables an extension of the identifier to be realized.

A transmitter may generate a modulation parameter for each transmission. In addition, a receiver may generate all modulation patterns in advance and use a generated modulation pattern upon reception.

6. Configuration Example of System According to Present Embodiment

Figure 7:
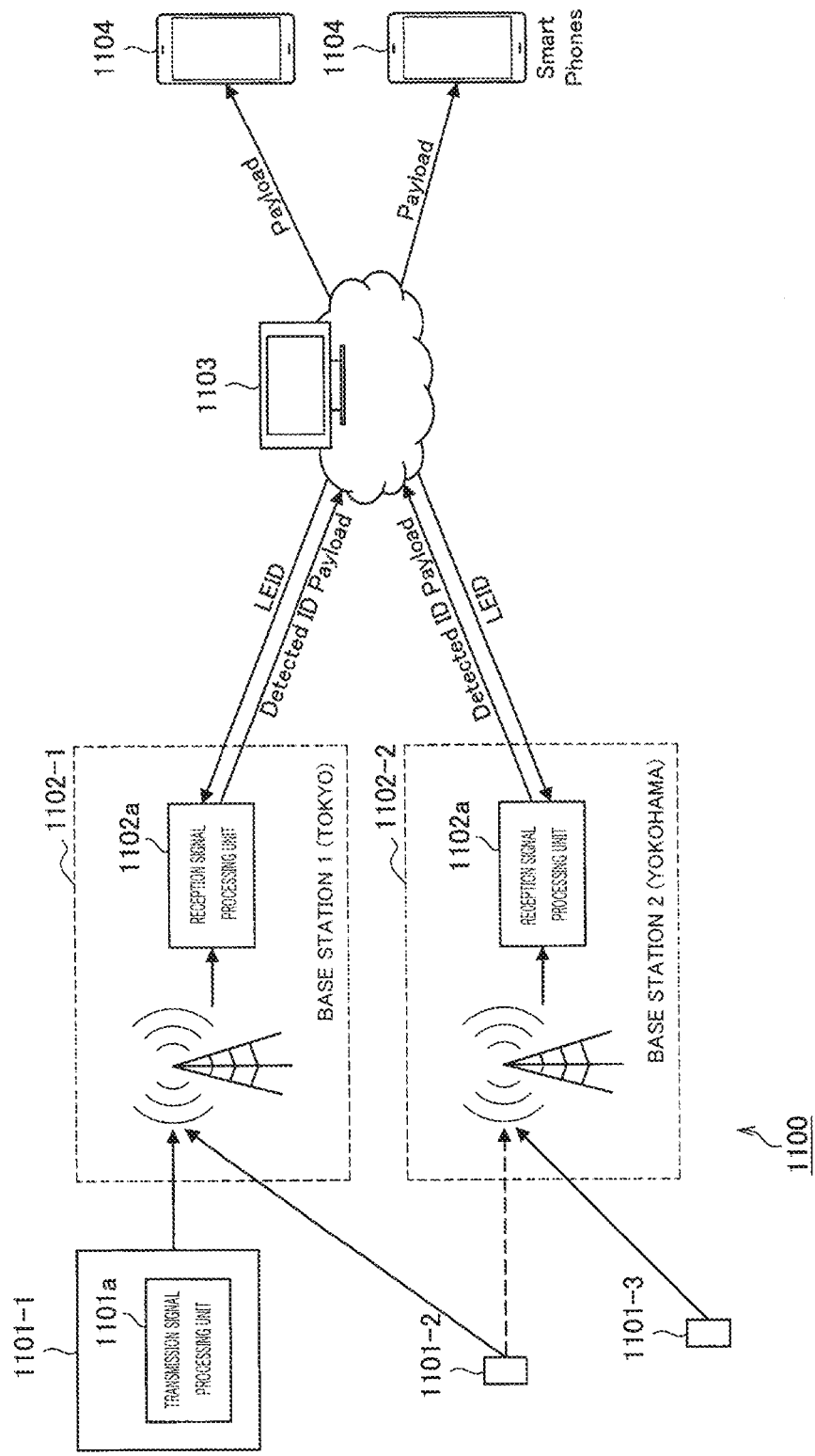
FIG. 7 is a schematic diagram which shows, in a similar manner to FIG. 6, a configuration of the modulation parameter table shown in FIG. 1 and which represents an example in which virtual high-order bits and a modulation parameter are associated with each other.

FIG. 7 is a diagram showing a main configuration example of an information communication system to which the present technique has been applied. An information notification system 1100 shown in FIG. 7 is a system in which a transmitter 1101 notifies information on the transmitter 1101 itself.

The transmitter 1101 is an embodiment of a transmitter to which the present technique has been applied and which transmits information acquired by itself as a wireless signal. It should be noted that a wireless communication system is not particularly limited. A base station 1102 is an embodiment of a receiver to which the present technique has been applied and which receives the wireless signal, acquires information on the transmitting apparatus 1101, and supplies a cloud server 1103 with the information and the like. In other words, the base station 1102 functions as a relay station which relays information transmitted from the transmitter 1101 and which transmits the information to the cloud server 1103. The transmission of information from the transmitter 1101 to the base station 1102 is performed by, for example, one-way communication. The cloud server 1103 manages various types of information of each transmitter 1101 and provides, for example, a service for notifying a user of a position of the transmitter 1101. For example, an information processing terminal 1104 to be operated by a user who wishes to locate the transmitter 1101 accesses the cloud server 1103, acquires positional information of the transmitter 1101, and notifies the user of the position of the transmitter 1101 by displaying the positional information together with map data or the like.

For example, the transmitter 1101 is carried around by a variety of users or mounted to an automobile, an electrical home appliance, or the like. For example, the transmitter 1101 can obtain its own positional information (for example, a latitude and a longitude) as appropriate by receiving a GPS (Global Positioning System) signal from a GPS satellite or the like. The transmitter 1101 transmits as a wireless signal, as appropriate, the positional information and various types of information acquired by a sensor provided in the transmitter 1101.

In addition, each transmitter 1101 has a unique identifier 10. The identifier 10 is registered in advance at the time of product shipment of each transmitter 1101 and recorded in a memory or the like of the transmitter 1101. The information of the identifier 10 is registered to the cloud server 1103 and, due to the cloud server 1103 transmitting the information to each base station 1102, shared among the respective base stations 1102. Therefore, based on the identifier 10, the base station 1102 can recognize the transmitter 1101 having transmitted the transmission frame 50 to be received. In addition, information on the OUI 30 and the eui [3] described above is recorded in a memory or the like of the transmitter 1101 by being transmitted by the cloud server 1103 to each transmitter 1101 or being registered in advance at the time of product shipment of each transmitter 1101. In a similar manner, information on the OUI 30 and the eui [3] described above is recorded in a memory or the like of the base station 1102 by being transmitted by the cloud server 1103 to each base station 1102 or being registered in advance to each base station 1102.

While three transmitting apparatuses 1101 are shown in FIG. 7, the number of the transmitting apparatuses 1101 is arbitrary. Although the transmitting apparatus 1101 may be constructed as a dedicated apparatus, for example, the transmitting apparatus 1101 may be built into a portable information processing apparatus such as a mobile phone or a smartphone.

The base station 1102 may be any kind of equipment. For example, a dedicated facility or a building structure may suffice. In addition, for example, equipment that can be installed on a roof, a rooftop, or the like of a building structure such as an ordinary building, a condominium, or a house may suffice. Furthermore, for example, portable equipment that can be carried around by a user or installed in a mobile body such as a vehicle may suffice.

The base station 1102 is installed in plurality. For example, in the case of FIG. 7, a base station 1102-1 is set in Tokyo and a base station 1102-2 is installed in Yokohama. While two base stations 1102 are shown in FIG. 7, the number of the base stations 1102 is arbitrary.

A configuration of the cloud server 1103 is arbitrary and, for example, the cloud server 1103 may be constituted by any number of servers, any number of networks, and the like. The cloud server 1103 may be provided in plurality.

In the position notification system 1100 described above, a transmission signal processing unit 1101*a* of the transmitting apparatus 1101 performs processing for inserting the identifier 10 into the transmission frame 50. In addition, the transmission signal processing unit 1101*a* of the transmitting apparatus 1101 modulates a carrier in accordance with data of the transmission frame 50 using a modulation pattern and transmits the modulated carrier to the base station 1102. In other words, the transmitting apparatus 1101 performs modulation based on a modulation parameter and transmits each packet based on settings of the modulation. Performing transmission using modulation in this manner enables an occurrence of cross talk to be suppressed and enables information to be transmitted in a reliable manner. The transmission signal processing unit 1101*a* is constituted by a circuit (hardware) or a central processing apparatus such as a CPU and a program (software) that enables the central processing apparatus to function.

In addition, by setting a modulation pattern in accordance with virtual high-order bits of the transmitter 1101, modulation patterns such as a synchronization pattern, a scrambled pattern, and a multiplexed pattern can be changed and an occurrence of a collision with a packet transmitted from another transmitting apparatus 1101 can be suppressed. In other words, information can be transmitted in a more reliable manner.

Furthermore, the base station 1102 acquires the identifier 10 of the transmitter 1101 from the cloud server 1103 and performs reception based on the identifier 10. In addition, the base station 1102 sets a modulation pattern based on the OUI 30 and the eui [3] acquired in advance. Once a modulation pattern is specified based on the OUI 30 and the eui [3], since the transmission frame 50 need only be detected based on the modulation pattern, the transmission frame 50 can be more readily detected even in cases where an S/N ratio is low and the like. Therefore, reception can be performed with higher sensitivity and more reliable information transmission can be achieved. In addition, since processing such as detecting the transmission frame 50 at an unnecessary timing or in an unnecessary frequency band need no longer be performed, an increase in load can be suppressed.

A reception signal processing unit 1102*a* included in the base station 1102 identifies a transmitter based on the identifier 10 having been individually given to each transmitter in order to identify the transmitter and the virtual high-order bits 20 which is used to identify a transmitter and which is shared among a plurality of transmitters 1101. More specifically, a transmitter is identified based on a modulation pattern that is generated using a modulation parameter obtained from the high-order bits 20. Therefore, a receiver will never receive a transmission signal transmitted from a transmitter belonging to an organization which differs from that of the base station 1102 and will never receive a transmission signal transmitted from a transmitter which differs from the identifier 10 to be received. Alternatively, a modulation pattern may be generated by the cloud server 1103 and transmitted from the cloud server 1103 to each transmitter 1101 and each base station 1102 to be shared by the transmitters 1101 and the base stations 1102. In addition, the base station 1102 can supply the cloud server 1103 with information related to a reception of a wireless signal such as when a wireless signal had been received from which transmitter 1101 as well as contents of the wireless signal (data extracted from the wireless signal) as reception information. The reception signal processing unit 1102*a* is constituted by a circuit (hardware) or a central processing apparatus such as a CPU and a program (software) that enables the central processing apparatus to function.

7. Function Block Configuration of Receiver

FIG. 8 is a block diagram showing a configuration of a receiver. As shown in FIG. 8, the receiver is constituted by a baseband converting unit 300, a selecting unit 310, a synchronization detecting unit 320, a descrambling unit 330, and a decoding/error-correcting unit 340.

The baseband converting unit 300 performs processing for converting a baseband of a received transmission frame 50. The selecting unit 310 performs processing for selecting a frequency channel using a pseudo-random number and selecting a transmission start grid. The pseudo-random number corresponds to a pseudo-random number generated by the pseudo-random number generating unit 260. By obtaining a multiplexed pattern (a transmission start grid number and a transmission channel number) using a pseudo-random number, a frequency channel is selected and a transmission start grid is selected.

The synchronization detecting unit 320 performs processing for detecting synchronization of a transmission signal of the transmission frame 50 using a synchronization pattern. The descrambling unit 330 performs descrambling processing using a scrambled pattern. The decoding/error-correcting unit 340 performs processing for decoding a transmission signal and correcting an error based on a CRC of the transmission frame 50. As described above, the receiver receives a transmission signal based on a pseudo-random number, a synchronization pattern, and a scrambled pattern. The receiver is capable of performing the processing described above because acquiring a modulation parameter based on the virtual high-order bits 20 in advance enables the receiver to recognize a modulation pattern.

8. Modifications According to Present Embodiment 8.1 Example of Extending Identifier by Changing Polynomial of LFSR While an example of changing an initial value of an LFSR in accordance with the OUI 30 and the eui [3] has been shown in the embodiment described above, a polynomial of the LFSR may be changed in accordance with the OUI 30 and the eui [3]. FIG. 9 is a schematic diagram which shows, in a similar manner to FIG. 6, a configuration of the modulation parameter table 100 shown in FIG. 1 and which represents an example in which the virtual high-order bits 20 and a modulation parameter are associated with each other.

In the example shown in FIG. 9, a polynomial of an LFSR is set in accordance with the OUI 30 and the eui [3]. Similarly, in FIG. 9, with respect to the eui [3], two values ("00" and "01") are given to Company A and one value ("00") is respectively given to Company B and Company C.

For example, with respect to a combination of the OUI 30 and the eui [3] (="00") of Company A, a polynomial 1 of the LFSR (#1) 200 and a polynomial 2 of the LFSR (#2) 210 for synchronization pattern generation are set. In a similar manner, with respect to a combination of the OUI 30 and the eui [3] (="01") of Company A, a polynomial 9 of the LFSR 230 for scrambled pattern generation is set and a polynomial 13 of the LFSR (#1) 240 and a polynomial 14 of the LFSR (#2) 250 for multiplexed pattern generation are set.

Figure 10:
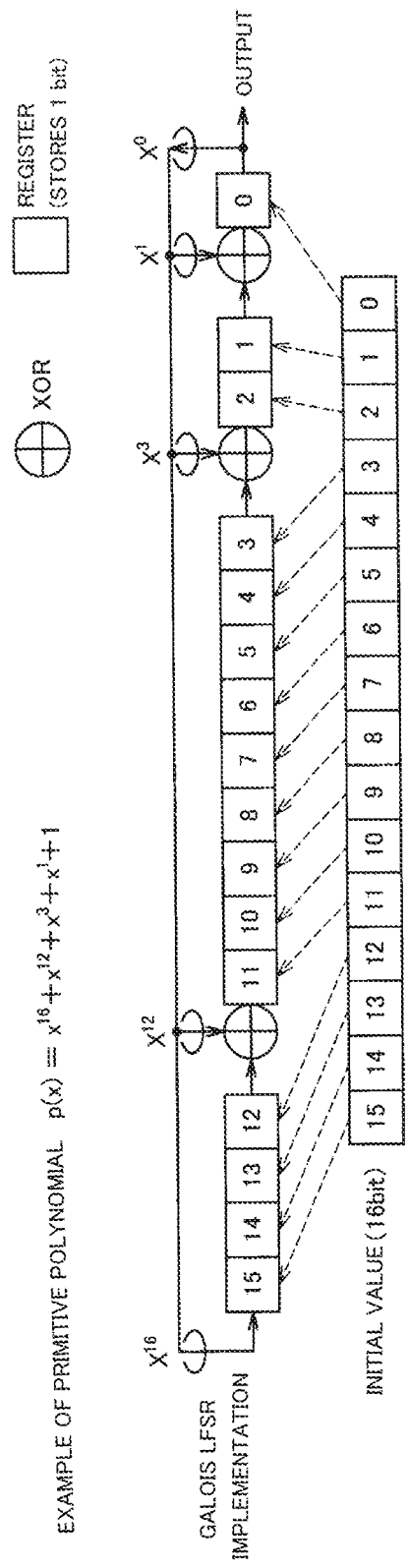
FIG. 10 is a schematic diagram showing an example of changing a polynomial.
Figure 11:
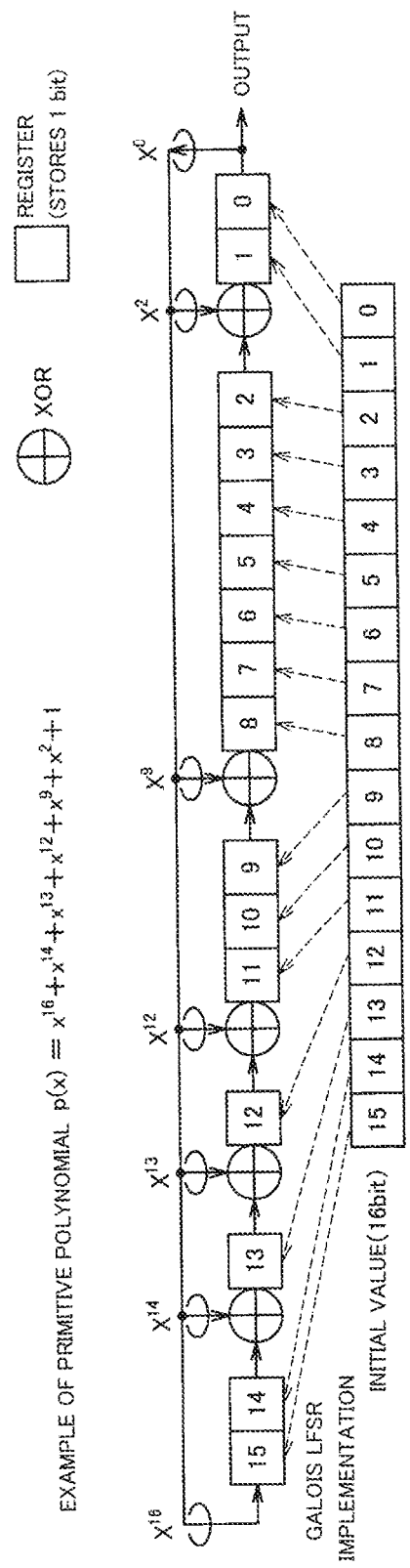
FIG. 11 is a schematic diagram showing an example of changing a polynomial.

FIGS. 10 and 11 are schematic diagrams showing an example of changing a polynomial. FIG. 10 shows an example in which a primitive polynomial is changed to the following equation.

$$p(x)=x^{16}+x^{12}+x^3+x^1+1$$

In addition, FIG. 11 shows an example in which a primitive polynomial is changed to the following equation.

$$p(x)=x^{16}+x^{14}+x^{13}+x^{12}+x^9+x^2+1$$

In doing so, since a polynomial is changed in accordance with the OUI 30 and the eui [3], an initial value need not be changed in accordance with the OUI 30 and the eui [3] and the same initial value may be used. For example, the initial value 1 of the LFSR (#1) 200 and the initial value 2 of the LFSR (#2) 210 for synchronization pattern generation of Company A and an initial value 5 of the LFSR (#1) 200 and an initial value 6 of the LFSR (#2) 210 for synchronization pattern generation of Company B may be respectively set to same values.

8.2 Example of Extending Identifier by Changing Initial Value and Polynomial of LFSR In this example, a change in an initial value in accordance with the OUI 30 and the eui [3] shown in FIG. 6 and a change in a polynomial in accordance with the OUI 30 and the eui [3] shown in FIG. 9 are combined to change both the initial value and the polynomial in accordance with the OUI 30 and the eui [3]. For example, with respect to the eui [3] (="00") of Company A, the initial value 1 of the LFSR (#1) 200 and the initial value 2 of the LFSR (#2) 210 for synchronization pattern generation are set and, at the same time, the polynomial 1 and the polynomial 2 are set. In a similar manner, with respect to the eui [3] (="00") of Company A, the initial value 9 of the LFSR 230 for scrambled pattern generation is set and, at the same time, the polynomial 9 is set.

8.3 Example of Partially Using Shared Modulation Parameters Among Plurality of Modulation Parameters In this example, for example, with respect to both the eui [3] (="00") and the eui [3] (="01") of Company A, an initial value of the LFSR (#1) 200 and an initial value of the LFSR (#2) 210 for synchronization pattern generation are set in common. In other words, the initial value 1 of the LFSR (#1) 200 when eui [3] (="00") and the initial value 3 of the LFSR (#1) 200 when eui [3] (="01") are set to the same value and the initial value 2 of the LFSR (#1) 200 when eui [3] (="00") and the initial value 4 of the LFSR (#1) 200 when eui [3] (="01") are set to the same value.

In this manner, when scramble generation parameters or multiplexing parameters differ between eui [3] (="00") and eui [3] (="01"), an initial value of the LFSR (#1) 200 and an initial value of the LFSR (#2) 210 for synchronization pattern generation can be set in common. Similarly, an initial value of a synchronization pattern generation parameter with respect to eui [3] (="00") of Company A and an initial value of a synchronization pattern generation parameter of Company B may be the same.

8.4 Other Modifications

One of or both of values of the OUI 30 and the eui [3] may be used as a part of an initial value of an LFSR. In addition, a part of a series generated using a scramble generation parameter can be replaced using one of or both of values of the OUI 30 and the eui [3]. Furthermore, in these two examples, all of the values or a part of the values may be used.

In addition, when generating a multiplexing parameter, the following values may be used as the two initial values. •The identifier 10 (TXID) and a TIMEWORD (a GPS time converted into a 32-bit value) are respectively set. •The identifier 10 (TXID) and a TIMEWORD are respectively set by interchanging respective parts thereof. In doing so, an interchanging method is adopted as a parameter. •One of or both of the identifier 10 (TXID) and a TIMEWORD are subjected to a cyclic bit shift and then respectively set. The number of times the cyclic bit shift is applied is adopted as a parameter.

It should be noted that the identifier 10 (TXID) and a TIMEWORD are used in order to prevent different terminals from adopting the same multiplexing parameter.

While an example in which an identifier is extended to 64 bits has been shown in the description given above, cases where the identifier 10 is longer than 32 bits can be accommodated by a similar method. For example, EUI-48, a 40-bit identifier, and an identifier of 33 bits or more and less than 64 bits can conceivably be accommodated.

By confirming a history of modulation patterns, transmission timings, and frequency hopping in ISM (Industry Science Medical) bands and all frequency bands used by specified low-power radio equipment, high-order bits (of a virtual ID) other than a TXID can be specified by table reference.

As described above, according to the present embodiment, by constructing a virtual identifier by combining a 32-bit identifier 10 and a modulation parameter, measures against depletion of identifiers, identification of terminals of transmitters, and compliance with international standards can be realized.

Specifically, even if the 32 bits of the identifier 10 are used up, changing a modulation parameter enables space for a new 32-bit identifier 10 to be secured and depletion of identifiers can be suppressed. In doing so, since the modulation pattern is changed using the virtual high-order bits 20, the identifier can be extended without increasing the number of bits of an identifier of the transmission frame 50 and without reducing data bits of the transmission frame.

In addition, even when the 32-bit identifier 10 included in a transmission frame is the same, since modulation of a transmitter differs, a terminal of the transmitter can be distinguished. Furthermore, changing a modulation parameter enables an enormous number of combinations to be realized and used as identifiers (IDs) for terminal identification. In the present example, even using only initial values of synchronization pattern generation realizes $(2^{25}-1) \times (2^{25}-1)$ combinations. It should be noted that 1 is subtracted because all zeros cannot be used. Accordingly, a terminal of a transmitter can be reliably identified.

Furthermore, an identifier for terminal identification that is required as international standards can be realized and compliance with international standards can be achieved.

While a preferred embodiment of the present disclosure has been described in detail with reference to the accompanying drawings, the technical scope of the present disclosure is not limited thereto. It will be obvious to a person with ordinary skill in the art to which the technical field of the present disclosure pertains that various modifications and changes can be arrived at without departing from the scope of the technical ideas as set forth in the appended claims and, as such, it is to be understood that such modifications and changes are to be naturally covered in the technical scope of the present disclosure.

Furthermore, the advantageous effects described in the present specification are merely descriptive or exemplary and not restrictive. In other words, the technique according to the present disclosure can produce, in addition to or in place of the advantageous effects described above, other advantageous effects that will obviously occur to those skilled in the art from the description of the present specification.

The following configurations are also covered in the technical scope of the present disclosure.

(1)
A receiving apparatus that identifies a transmitting apparatus based on a first identifier having been individually given to each transmitting apparatus in order to identify the transmitting apparatus and a second identifier which is for identifying the transmitting apparatus and which is being shared among a plurality of the transmitting apparatuses.

(2)
The receiving apparatus according to (1), wherein the first identifier is included in a transmission frame to be transmitted by the transmitting apparatus.

(3)
The receiving apparatus according to (1) or (2), wherein a transmission signal having been transmitted from the transmitting apparatus is received based on a modulation pattern associated with the second identifier.

(4)
The receiving apparatus according to (3), wherein the second identifier is associated with a modulation parameter for generating the modulation pattern.

(5)
The receiving apparatus according to (4), wherein the second identifier is associated with an initial value of an LFSR or a polynomial of the LFSR when generating the modulation pattern using the LFSR from the modulation parameter.

(6)
The receiving apparatus according to (5), wherein the second identifier is associated with one of or both of the initial value and the polynomial.

(7)
The receiving apparatus according to any one of (3) to (6), wherein the modulation pattern includes at least one of a synchronization pattern, a scrambled pattern, and a multiplexed pattern.

(8)
The receiving apparatus according to (7), wherein the synchronization pattern, the scrambled pattern, and the multiplexed pattern are associated with the second identifier.

(9)
The receiving apparatus according to any one of (1) to (8), wherein the second identifier includes unique information given to each organization that performs communication.

(10)
A transmitting apparatus which inserts a first identifier having been individually given to each transmitting apparatus into a transmission frame and which modulates a transmission signal of the transmission frame based on a second identifier being shared among a plurality of the transmitting apparatuses and transmits the modulated transmission signal to a receiving apparatus.

(11)
The transmitting apparatus according to (10), wherein the transmission signal of the transmission frame is modulated using a modulation pattern associated with the second identifier.

(12)
The transmitting apparatus according to (11), wherein the second identifier is associated with a modulation parameter for generating the modulation pattern.

(13)
The transmitting apparatus according to (12), wherein the second identifier is associated with an initial value of an LFSR or a polynomial of the LFSR when generating the modulation pattern using the LFSR from the modulation parameter.

(14)
The transmitting apparatus according to (13), wherein the second identifier is associated with one of or both of the initial value and the polynomial.

(15)
The transmitting apparatus according to any one of (11) to (14), wherein the modulation pattern includes at least one of a synchronization pattern, a scrambled pattern, and a multiplexed pattern.

(16)
The transmitting apparatus according to (15), wherein the synchronization pattern, the scrambled pattern, and the multiplexed pattern are associated with the second identifier.

(17)
The transmitting apparatus according to any one of (10) to (16), wherein the second identifier includes unique information given to each organization that performs communication.

(18)
A receiving method including: identifying a transmitting apparatus based on a first identifier having been individually given to each transmitting apparatus in order to identify the transmitting apparatus and a second identifier which is for identifying the transmitting apparatus and which is being shared among a plurality of the transmitting apparatuses.

(19)
A transmitting method including: inserting a first identifier having been individually given to each transmitting apparatus into a transmission frame; and modulating a transmission signal of the transmission frame based on a second identifier being shared among a plurality of the transmitting apparatuses and transmitting the modulated transmission signal to a receiving apparatus.

REFERENCE SIGNS LIST

10 Identifier
50 Transmission frame
200, 210, 230, 240, 250 LFSR
1101 Transmitter
1101a Transmission signal processing unit
1102 Base station (receiver)
1102a Reception signal processing unit

The invention claimed is:
1. A receiving apparatus comprising:
a memory;
a receiver; and
control circuitry configured to:
receive, from a transmitting apparatus of a plurality of transmitting apparatuses that are related to a single organization, a signal having inserted therein a first identifier uniquely assigned to the transmitting apparatus by the single organization, wherein the signal has been modulated by the transmitting apparatus by one or more modulation patterns, each of the one or more modulation patterns being related to a second identifier that comprises a first part and a second part, wherein the first part comprises an organization identifier that is uniquely assigned to the single organization and that is common to all of the plurality of transmitting apparatuses related to the single organization, wherein the second part comprises additional identification bits assigned to the transmitting apparatus by the single organization, wherein the one or more modulation patterns related to the second identifier are one or more of a synchronization pattern, a scrambling pattern, or a multiplexing pattern, and wherein each of the one or more modulation patterns related to the second identifier are generated by a corresponding Linear Feedback Shift Register (LFSR);

demodulate the signal based on each of the one or more modulation patterns, extract the first identifier from the demodulated signal; and identify the transmitting apparatus, from among the plurality of transmitting apparatuses, based on the extracted first identifier.

2. The receiving apparatus according to claim 1, wherein the synchronization pattern, the scrambling pattern, and the multiplexing pattern each have different lengths.

3. The receiving apparatus according to claim 2, wherein:
the synchronization pattern is generated by two LFSRs having unique generation parameters related to the second identifier and having a first length,
the scrambling pattern is generated by one LFSR having a generation parameter related to the second identifier and having a second length, and
the multiplexing pattern is generated by two LFSRs having unique generation parameters related to the second identifier and having a third length.

4. The receiving apparatus according to claim 2, wherein:
the synchronization pattern is generated by two LFSR polynomials related to the second identifier and having a first length,
the scrambling pattern is generated by one predetermined LFSR polynomial related to the second identifier and having a second length, and
the multiplexing pattern is generated by two predetermined LFSR polynomials related to the second identifier and having a third length.

5. The receiving apparatus according to claim 2, wherein:
the synchronization pattern is generated by two LFSR polynomials and corresponding LFSR generation parameters, each related to the second identifier and having a first length,
the scrambling pattern is generated by one predetermined LFSR polynomial and a corresponding LFSR generation parameter, each related to the second identifier and having a second length, and
the multiplexing pattern is generated by two predetermined LFSR polynomials and corresponding LFSR generation parameters, each related to the second identifier and having a third length.

6. The receiving apparatus according to claim 1, wherein the control circuitry demodulates the signal by at least one of:

synchronizing the signal based on the synchronization pattern,
descrambling the signal based on the scrambling pattern, or
demultiplexing the signal based on the multiplexing pattern.

7. The receiving apparatus according to claim 1,
wherein the one or more modulation patterns comprise the synchronization pattern, the scrambling pattern, and the multiplexing pattern, and
wherein the control circuitry demodulates the signal by:
synchronizing the signal based on the synchronization pattern,
descrambling the signal based on the scrambling pattern, and
demultiplexing the signal based on the multiplexing pattern.

8. A transmitting apparatus comprising:
a memory;
a transmitter; and
control circuitry configured to:
insert a first identifier into a signal, the first identifier uniquely assigned to the transmitting apparatus by a single organization; and
transmit the signal,
wherein the signal is modulated by the control circuitry by one or more modulation patterns, each of the one or more modulation patterns being related to a second identifier that comprises a first part and a second part,
wherein the first part comprises an organization identifier that is uniquely assigned to the single organization and that is common to all of the plurality of transmitting apparatuses related to the single organization,
wherein the second part comprises additional identification bits assigned to the transmitting apparatus by the single organization,
wherein the one or more modulation patterns related to the second identifier are one or more of a synchronization pattern, a scrambling pattern, or a multiplexing pattern, and
wherein each of the one or more modulation patterns related to the second identifier are generated by a corresponding Linear Feedback Shift Register (LFSR).

9. The transmitting apparatus according to claim 8, wherein the synchronization pattern, the scrambling pattern, and the multiplexing pattern each have different lengths.

10. The transmitting apparatus according to claim 9, wherein:
the synchronization pattern is generated by two LFSRs having unique generation parameters related to the second identifier and having a first length,
the scrambling pattern is generated by one LFSR having a generation parameter related to the second identifier and having a second length, and
the multiplexing pattern is generated by two LFSRs having unique generation parameters related to the second identifier and having a third length.

11. The transmitting apparatus according to claim 9, wherein:
the synchronization pattern is generated by two LFSRs having unique generation parameters related to the second identifier and having a first length, the scrambling pattern is generated by one LFSR having a generation parameter related to the second identifier and having a second length, and the multiplexing pattern is generated by two LFSRs having unique generation parameters related to the second identifier and having a third length.

12. The transmitting apparatus according to claim 9, wherein:

the synchronization pattern is generated by two LFSR polynomials related to the second identifier and having a first length, the scrambling pattern is generated by one predetermined LFSR polynomial related to the second identifier and having a second length, and the multiplexing pattern is generated by two predetermined LFSR polynomials related to the second identifier and having a third length.

13. The transmitting apparatus according to claim 9, wherein:

the synchronization pattern is generated by two LFSR polynomials and corresponding LFSR generation parameters, each related to the second identifier and having a first length, the scrambling pattern is generated by one predetermined LFSR polynomial and a corresponding LFSR generation parameter, each related to the second identifier and having a second length, and the multiplexing pattern is generated by two predetermined LFSR polynomials and corresponding LFSR generation parameters, each related to the second identifier and having a third length.

14. The transmitting apparatus according to claim 8, wherein the control circuitry modulates the signal by at least one of:

applying the synchronization pattern to the signal,
scrambling the signal based on the scrambling pattern, or
multiplexing the signal based on the multiplexing pattern.

15. The transmitting apparatus according to claim 8, wherein the one or more modulation patterns comprise the synchronization pattern, the scrambling pattern, and the multiplexing pattern, and wherein the control circuitry demodulates the signal by:
applying the synchronization pattern to the signal,
scrambling the signal based on the scrambling pattern, and
multiplexing the signal based on the multiplexing pattern.

16. A method performed by a communication device and comprising:

receiving, from a transmitting apparatus of a plurality of transmitting apparatuses that are related to a single organization, a signal having inserted therein a first identifier uniquely assigned to the transmitting apparatus by the single organization, wherein the signal has been modulated by the transmitting apparatus by one or more modulation patterns, each of the one or more modulation patterns being related to a second identifier that comprises a first part and a second part, wherein the first part comprises an organization identifier that is uniquely assigned to the single organization and that is common to all of the plurality of transmitting apparatuses related to the single organization, wherein the second part comprises additional identification bits assigned to the transmitting apparatus by the single organization, wherein the one or more modulation patterns related to the second identifier are one or more of a synchronization pattern, a scrambling pattern, or a multiplexing pattern, and wherein each of the one or more modulation patterns related to the second identifier are generated by a corresponding Linear Feedback Shift Register (LFSR);

demodulating the signal based on each of the one or more modulation patterns, extracting the first identifier from the demodulated signal; and identifying the transmitting apparatus, from among the plurality of transmitting apparatuses, based on the extracted first identifier.

17. A method performed by a communication device and comprising:

inserting a first identifier into a signal, the first identifier uniquely assigned to the transmitting apparatus by a single organization; and transmitting the signal, wherein the transmitting includes modulating the signal by one or more modulation patterns, each of the one or more modulation patterns being related to a second identifier that comprises a first part and a second part, wherein the first part comprises an organization identifier that is uniquely assigned to the single organization and that is common to all of the plurality of transmitting apparatuses related to the single organization, wherein the second part comprises additional identification bits assigned to the transmitting apparatus by the single organization, wherein the one or more modulation patterns related to the second identifier are one or more of a synchronization pattern, a scrambling pattern, or a multiplexing pattern, and wherein each of the one or more modulation patterns related to the second identifier are generated by a corresponding Linear Feedback Shift Register (LFSR).

* * * * *